United States Patent
Zhao et al.

(10) Patent No.: US 11,847,194 B2
(45) Date of Patent: Dec. 19, 2023

(54) SCHEDULING METHOD AND APPARATUS, DEVICE AND STORAGE MEDIUM

(71) Applicant: BAIDU ONLINE NETWORK TECHNOLOGY (BEIJING) CO., LTD., Beijing (CN)

(72) Inventors: Yidi Zhao, Beijing (CN); Xiuhui Zhao, Beijing (CN); Zhucheng Guo, Beijing (CN); Pengfei Gui, Beijing (CN); Guangyong Xu, Beijing (CN); Zenglin Song, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 408 days.

(21) Appl. No.: 17/209,767

(22) Filed: Mar. 23, 2021

(65) Prior Publication Data

US 2021/0224363 A1 Jul. 22, 2021

(30) Foreign Application Priority Data

Jun. 29, 2020 (CN) .......................... 202010604519.6

(51) Int. Cl.
*G06F 21/30* (2013.01)
*G06F 9/48* (2006.01)
*G06N 5/04* (2023.01)

(52) U.S. Cl.
CPC .............. *G06F 21/30* (2013.01); *G06F 9/485* (2013.01); *G06N 5/04* (2013.01)

(58) Field of Classification Search
CPC .. H04L 63/1416; H04L 63/1441; H04W 4/40; H04W 12/121
See application file for complete search history.

(56) References Cited

U.S. PATENT DOCUMENTS 9,413,751 B2 * 8/2016 Uchida ................... G06F 21/41
10,282,229 B2    5/2019 Wagner et al.
(Continued)

FOREIGN PATENT DOCUMENTS

CN    101984412 B    1/2013
CN    107172057 A    9/2017
(Continued)

OTHER PUBLICATIONS

Extended European Search Report for Application No. 21164011.5, dated Sep. 8, 2021, 8 pages.
(Continued)

*Primary Examiner* — Kambiz Zand
*Assistant Examiner* — Afaq Ali
(74) *Attorney, Agent, or Firm* — Banner & Witcoff, Ltd.

(57) ABSTRACT

A scheduling method and apparatus, a device and a storage medium, which relate to fields of big data, cloud computation, artificial intelligence, intelligent authentication and intelligent scheduling. A specific implementation includes: acquiring an authentication request that indicates to-be-authenticated information; determining an authentication strategy group required by an authentication processing procedure of the to-be-authenticated information, wherein the authentication strategy group is determined based on an authentication dependency relationship between authentication strategies and comprises at least two authentication strategies; and calling the authentication strategies in the authentication strategy group in parallel, and performing authentication processing on the to-be-authenticated information in parallel, to obtain an authentication processing result corresponding to the authentication strategy group.

15 Claims, 5 Drawing Sheets

(56) References Cited

U.S. PATENT DOCUMENTS

| | | | | |
|---|---|---|---|---|
| 2007/0101406 A1* | 5/2007 | Zavalkovsky | ........ | H04L 9/3273 |
| | | | | 726/4 |
| 2014/0282835 A1 | 9/2014 | Guinan | | |
| 2014/0282838 A1 | 9/2014 | Guinan | | |
| 2017/0178106 A1* | 6/2017 | Yue | ...................... | G06Q 20/405 |
| 2017/0295019 A1* | 10/2017 | Fukuda | ............... | H04L 63/0428 |
| 2019/0272361 A1* | 9/2019 | Kursun | ................. | H04L 67/535 |
| 2021/0006564 A1* | 1/2021 | Prasad Nittur | ....... | H04L 63/102 |

FOREIGN PATENT DOCUMENTS

| | | | |
|---|---|---|---|
| CN | 107590186 A | | 1/2018 |
| CN | 108228329 A | | 6/2018 |
| JP | 2006011768 A | | 1/2006 |
| JP | 2017151759 A | * | 8/2017 |
| JP | 2017151759 A | | 8/2017 |
| JP | 6399605 B2 | | 10/2018 |

OTHER PUBLICATIONS

Notice of Reasons for Refusal for Japanese Application No. 2021-087299, dated Mar. 28, 2022, 6 pages.
Jun. 12, 2023—(CN) First Search Report—App. No. 2020106045196 w/ translation.
Jun. 16, 2023—(CN) First Office Action—App. No. 2020106045196 w/ translation.

* cited by examiner

SCHEDULING METHOD AND APPARATUS, DEVICE AND STORAGE MEDIUM

CROSS-REFERENCE TO RELATED APPLICATION

This application claims priority to Chinese patent application No. 202010604519.6, filed on Jun. 29, 2020, which is hereby incorporated by reference in its entirety.

TECHNICAL FIELD

The present application relates to a field of data processing, and particularly to fields of big data, cloud computation, artificial intelligence, intelligent authentication and intelligent scheduling.

BACKGROUND

The intelligent authentication is to provide subjects such as enterprises, institutions and individuals with integrated solutions such as identity recognition and information verification, based on technical capabilities such as artificial intelligence, big data, cloud computation, etc. With the increasing need of the authentication, the authentication strategies are continuously enriched.

SUMMARY

A scheduling method and apparatus, a device and a storage medium are provided according to embodiments of the present application.

In an aspect of the present application, a scheduling method is provided according to an embodiment of the present application, which includes:

acquiring an authentication request that indicates to-be-authenticated information;

determining an authentication strategy group required by an authentication processing procedure of the to-be-authenticated information, wherein the authentication strategy group is determined based on an authentication dependency relationship between authentication strategies and includes at least two authentication strategies; and calling the authentication strategies in the authentication strategy group in parallel, and performing authentication processing on the to-be-authenticated information in parallel, to obtain an authentication processing result corresponding to the authentication strategy group.

In another aspect of the present application, a scheduling apparatus is provided according to an embodiment of the present application, which includes:

a request acquisition unit configured for acquiring an authentication request that indicates to-be-authenticated information;

a strategy determination unit configured for determining an authentication strategy group required by an authentication processing procedure of the to-be-authenticated information, wherein the authentication strategy group is determined based on an authentication dependency relationship between authentication strategies and includes at least two authentication strategies; and a strategy scheduling unit configured for calling the authentication strategies in the authentication strategy group in parallel, and performing authentication processing on the to-be-authenticated information in parallel, to obtain an authentication processing result corresponding to the authentication strategy group.

In still another aspect of the present application, an electronic device is provided according to an embodiment of the present application, which includes:

at least one processor; and a memory communicatively connected to the at least one processor, wherein the memory stores instructions executable by the at least one processor, and the instructions, when executed by the at least one processor, enable the at least one processor to perform the aforementioned method.

In yet another aspect of the present application, a non-transitory computer readable storage medium storing computer instructions is provided according to an embodiment of the present application, wherein the computer instructions cause a computer to perform the aforementioned method.

It should be understood that the content described in this section is intended neither to identify the key or important features of the embodiments of the present application, nor to limit the scope of the present application. Other features of the present application will be easily understood from the following description.

BRIEF DESCRIPTION OF THE DRAWINGS

The accompanying drawings are provided for better understanding of the solution, rather than limiting the present application, wherein.

DETAILED DESCRIPTION OF THE DRAWINGS

Exemplary embodiments of the present application are described below with reference to the accompanying drawings, including various details of the embodiments of the present application to facilitate the understanding, and they should be considered as merely exemplary. Thus, it should be realized by those of ordinary skill in the art that various changes and modifications may be made to the embodiments described here without departing from the scope and spirit of the present application. Also, for the sake of clarity and conciseness, the description of well-known functions and structures are omitted in the following description.

A goal of intelligent authentication is to provide subjects such as enterprises, institutions and individuals with integrated solutions such as identity recognition and information verification, based on technical capabilities such as artificial intelligence, big data, cloud computation, etc. With the increasing need of the authentication, the authentication strategies are continuously enriched. However, in the existing authentication procedure, the authentication strategies are executed in sequence, and with the increase of the authentication strategies, the efficiency of authentication processing will inevitably decrease.

Figure 1:
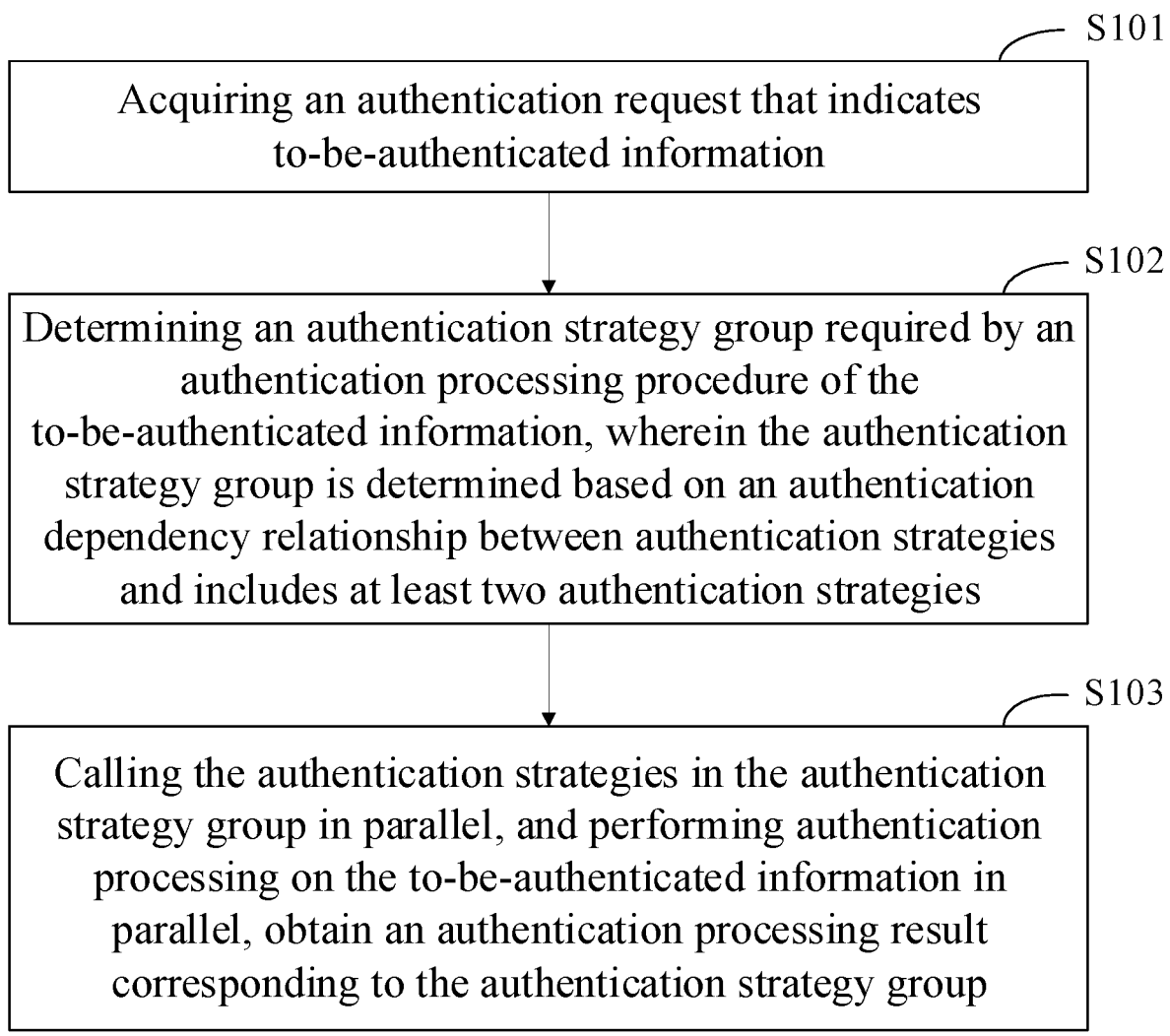
FIG. 1 is a first schematic flowchart of an implementation of a scheduling method according to an embodiment of the present application.

A scheduling method is provided according to an embodiment of the present application, as shown in FIG. 1, the method may include:

S101, acquiring an authentication request that indicates to-be-authenticated information.

S102, determining an authentication strategy group required by an authentication processing procedure of the to-be-authenticated information, wherein the authentication strategy group is determined based on an authentication dependency relationship between authentication strategies and includes at least two authentication strategies; and S103, calling the authentication strategies in the authentication strategy group in parallel, and performing authentication processing on the to-be-authenticated information in parallel, to obtain an authentication processing result corresponding to the authentication strategy group.

The technology according to the present application solves the problem in the existing technology that the authentication processing efficiency is decreased with the increase of the authentication strategies.

In this way, in the solution of the present application, the authentication strategy group can be determined based on the authentication dependency relationship between the authentication strategies, and after the authentication strategy group required by the authentication processing procedure of the to-be-authenticated information is determined, the authentication strategies in the group can perform authentication processing on the to-be-authenticated information in parallel, thus the authentication processing efficiency certainly can be improved, and especially when there are many authentication strategies, the efficiency improvement advantage of the solution of the present application is more prominent.

In a specific example of the solution of the present application, the authentication procedures of the authentication strategies in the authentication strategy group are independent from each other, so as to ensure that the authentication strategies in the authentication strategy group can be executed in parallel and effectively. That is, the authentication procedures of the authentication strategies in the authentication strategy group are unrelated to each other, thus laying foundations for the parallel operations and the improvement of the authentication processing efficiency.

In a specific example of the solution of the present application, it is considered that in actual scenes, there may be a dependency relationship between authentication strategies, such as a dependency of the calling sequence. For example, an authentication result of an authentication strategy A is an input parameter of an authentication strategy B, i.e., the normal operation of the authentication strategy B depends on the authentication result of the authentication strategy A, and at this time, the existing problem of inefficiency cannot be solved simply by loading the authentication strategies in parallel. On this basis, when the authentication strategies are to be grouped, those authentication strategies having an authentication dependency relationship may be classified into different groups, i.e., the authentication strategies in different authentication strategy groups have an authentication dependency relationship, so as to ensure the efficient and normal execution of the authentication processing procedure. Of course, the authentication procedures of the authentication strategies in the different authentication strategy groups may also be independent from each other.

In a specific example, before the authentication processing, authentication strategies required by the authentication processing procedure may be acquired firstly, e.g., all of the authentication strategies may be acquired, and then the authentication strategies are grouped based on an authentication dependency relationship therebetween to obtain authentication strategy groups, wherein the authentication procedures of the authentication strategies in an authentication strategy group are independent from each other, while the authentication procedures of the authentication strategies in different authentication strategy groups have or have no authentication dependency relationship, so as to ensure that the authentication processing procedures in the authentication strategy group can be performed in parallel, thereby efficiently improving the authentication processing efficiency.

In a specific example of the solution of the present application, in practical applications, the authentication procedure of the to-be-authenticated information may need to be supported by a plurality of authentication strategy groups. At this time, after it is determined that there are at least two authentication strategy groups required by the authentication processing procedure of the to-be-authenticated information, the authentication strategy groups required by the to-be-authenticated information are called in sequence according to a preset dependency relationship, and authentication processing is performed on the to-be-authenticated information in sequence. That is, after it is determined that there are at least two authentication strategy groups required by the authentication processing procedure of the to-be-authenticated information, the authentication strategy groups required by the to-be-authenticated information are called in sequence according to the preset dependency relationship, so that the authentication processing is performed on the to-be-authenticated information in sequence among the authentication strategy groups according to the preset dependency relationship, while authentication strategies in an authentication strategy group perform the authentication processing on the to-be-authenticated information in parallel. In this way, the solution of the present application can also improve the processing efficiency even for the authentication strategies having the dependency relationship, so that the authentication procedure can be completed normally and efficiently, and the application scenes are enriched.

In a specific example of the solution of the present application, it is considered that in actual scenes, there may be a dependency relationship between authentication strategies to ensure that the solution of the present application can be applied in a plurality of scenes, such as a scene where the authentication strategies are independent from each other, or a scene where the authentication strategies have a dependency relationship therebetween. At this time, a preset dependency relationship between the authentication strategy groups may be determined in advance when the authentication strategies are grouped, so as to ensure the normal and efficient operation of the authentication procedure. Of course, when the to-be-authenticated information is determined and it is learned that the authentication procedure of the to-be-authenticated information requires at least two authentication strategy groups, the authentication dependency relationship between the authentication strategy groups may be determined based on the to-be-authenticated information, so as to obtain the preset dependency relationship of the to-be-authenticated information; next, the authentication strategy groups required by the to-be-authenticated information are called in sequence based on the preset dependency relationship, and the authentication processing is performed on the to-be-authenticated information in sequence among the authentication strategy groups.

Figure 2:
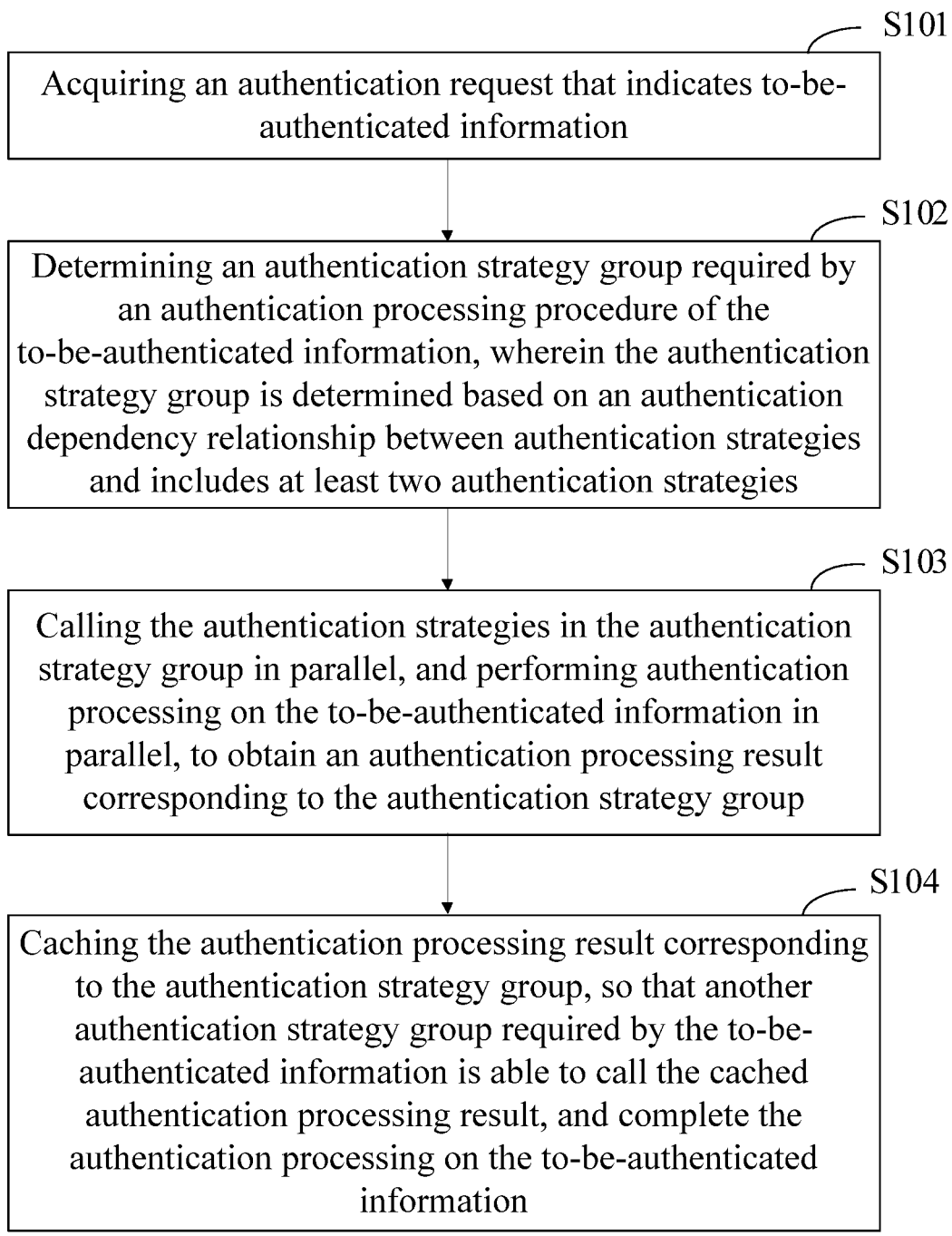
FIG. 2 is a second schematic flowchart of an implementation of a scheduling method according to an embodiment of the present application.

In a specific example of the solution of the present application, it needs to further improve the authentication processing efficiency and avoid the repeated execution of authentication strategies having an authentication dependency relationship. For example, the normal operations of an authentication strategy group B and an authentication strategy group C both depend on an authentication processing result of an authentication strategy group A. At this time, in order to avoid the repeated execution of the authentication strategy group A, an authentication processing result of the authentication strategy group A may be cached, and directly called when another authentication strategy group requires. For example, the authentication processing result of the authentication strategy group A may be cached, and then called during the execution of either of the authentication strategy group B and the authentication strategy group C, so as to ensure the normal operation of the authentication strategy group C. Meanwhile, the authentication processing efficiency is further improved and the application scenes are enriched, which lays a foundation for the subsequent engineering applications. Specifically, as shown in FIG. 2, after obtaining an authentication processing result corresponding to an authentication strategy group, the following step is performed: S104, caching the authentication processing result corresponding to the authentication strategy group, so that another authentication strategy group required by the to-be-authenticated information is able to call the cached authentication processing result, and complete the authentication processing on the to-be-authenticated information.

In this way, in the solution of the present application, the authentication strategy groups can be determined based on the authentication dependency relationship between the authentication strategies, and after an authentication strategy group required by the authentication processing procedure of the to-be-authenticated information is determined, the authentication strategies in the group can perform authentication processing on the to-be-authenticated information in parallel, so the authentication processing efficiency certainly can be improved, and especially when there are many authentication strategies, the efficiency improvement advantage of the solution of the present application is more prominent.

Next, the solution of the present application will be further described in detail with a specific example. Specifically, this example provides an intelligent authentication strategy scheduling solution, which realizes automatic loading and unified scheduling and management of the authentication strategies by configuring and scheduling the authentication strategies. Through this solution, the authentication processing efficiency can be improved, and a response to a new authentication strategy can be made quickly without updating the research and development for each of the authentication strategies. Therefore, the launch cycle of the authentication strategies is shortened, the research and development efficiency is improved, and the iterative efficiency of the authentication strategies is also improved.

Meanwhile, since the solution of the present application can perform a unified management of the authentication strategies, for example through an authentication strategy platform such as an authentication strategy module in an authentication system, the authentication strategies can be configured quickly, and a custom plug-in can be supported, so as to meet the personalized requirement of the authentication strategy scheduling. Moreover, the parameter assignment between strategies can be realized through grouping and parameter reloading of the authentication strategies, thereby reducing the time cost by the calling to the largest extent and increasing the strategy loading speed.

Before the scheduling flow is performed, firstly a strategy configuration is made, e.g., configuring a class of an authentication strategy, a processing function or a Uniform Resource Identifier (URI), a name of a required parameter, a result formatting mapping relationship, etc. Next, a rule definition is made, e.g., the authentication strategies may be grouped according to an authentication dependency relationship therebetween, and a corresponding dependency relationship may be set such that the authentication strategies in each group are independent from each other to be executable in parallel. In this way, the authentication processing time is reduced, and the authentication processing efficiency is improved. Meanwhile, the authentication strategies having an authentication dependency relationship are classified into different groups, so that authentication processing is performed in sequence among the groups based on the authentication dependency relationship, and the parameter reloading and the parameter assignment among the authentication strategy groups are realized, to avoid the repeated execution of the authentication strategies.

Figure 3:
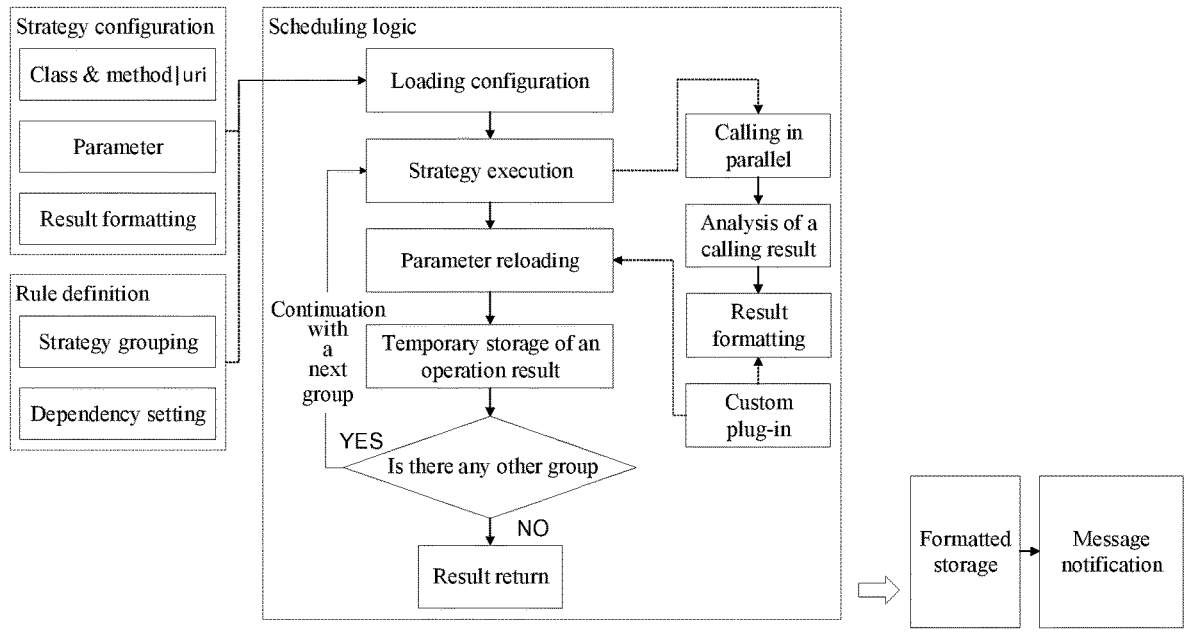
FIG. 3 is a schematic flowchart of an implementation of a scheduling method according to an embodiment of the present application in a specific example.

As shown in FIG. 3, the scheduling flow is as follows: firstly, the configuration is loaded based on an authentication request, and after authentication strategy groups are obtained, the strategies are executed, i.e., respective authentication strategies are executed from the first authentication strategy group, wherein the authentication strategies in a same group are called in parallel, to obtain an operation result corresponding to the authentication strategy group (i.e., a calling result) by parsing, and the operation result is formatted according to the configured result formatting mapping relationship and then cached. According to the authentication dependency relationship in the rule definition, the formatted operation result is assigned to an input parameter of a next group (i.e., an authentication strategy group with the authentication dependency relationship), so that the next group can realize parameter reloading, and obtain an operation result, which will be formatted and cached to facilitate the subsequent dependency calling. The above steps are cycled in turn until the authentication processing is performed in sequence among all of the groups, and a final authentication result is output. Of course, the operation result throughout the operation procedure may be subjected to preset formatting processing, and may also be customized by the custom plug-in, thereby converting the operation result into data of a required format.

Here, by supporting the custom plug-in when the authentication strategies have been executed and the parameter reloading begins, a personalized logic, such as an official data comparison, can be achieved.

Therefore, the solution of the present application, on the one hand, can shorten the launch cycle of the authentication strategies and improve the research and development efficiency, and on the other hand, can improve the loading speed of the authentication strategies by grouping and calling the authentication strategies in parallel, thereby reducing the user waiting time for authentication and optimizing the user experience. Finally, since the custom plug-in can be supported, the solution of the present application can have a good extensibility and meet different personalized requirements.

Figure 4:
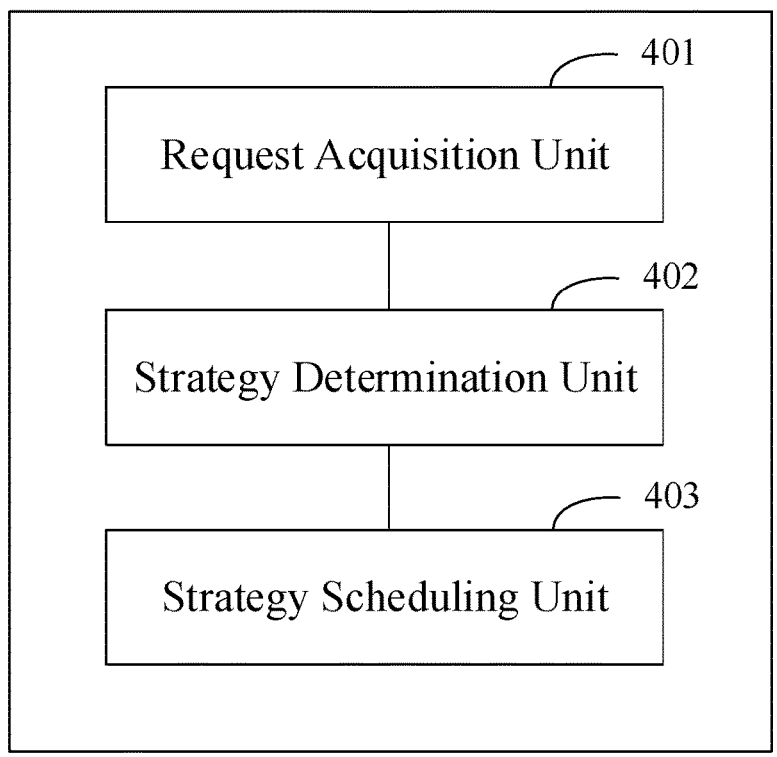
FIG. 4 is a first structural schematic diagram of a scheduling apparatus according to an embodiment of the present application.

A scheduling apparatus is further provided according to an embodiment of the present application, as shown in FIG. 4, the apparatus may include:

a request acquisition unit 401 configured for acquiring an authentication request that indicates to-be-authenticated information;

a strategy determination unit 402 configured for determining an authentication strategy group required by an authentication processing procedure of the to-be-authenticated information, wherein the authentication strategy group is determined based on an authentication dependency relationship between authentication strategies and includes at least two authentication strategies; and a strategy scheduling unit 403 configured for calling the authentication strategies in the authentication strategy group in parallel, and performing authentication processing on the to-be-authenticated information in parallel, to obtain an authentication processing result corresponding to the authentication strategy group.

In a specific example of the solution of the present application, the authentication procedures of the authentication strategies in the authentication strategy group are independent from each other, so as to ensure that the authentication strategies in the authentication strategy group can be executed in parallel and effectively. That is, the authentication procedures of the authentication strategies in the authentication strategy group are unrelated to each other, thus laying foundations for the parallel operations and the improvement of the authentication processing efficiency.

In a specific example of the solution of the present application, the authentication strategies in different authentication strategy groups have an authentication dependency relationship or are independent from each other. Here, it is considered that in actual scenes, there may be a dependency relationship between the authentication strategies, such as a dependency of the calling sequence. For example, an authentication result of an authentication strategy A is an input parameter of an authentication strategy B, i.e., the normal operation of the authentication strategy B depends on the authentication result of the authentication strategy A, and at this time, the existing problem of inefficiency cannot be solved simply by loading the authentication strategies in parallel. On this basis, when the authentication strategies are to be grouped, those authentication strategies having an authentication dependency relationship may be classified into different groups, i.e., authentication strategies in different authentication strategy groups have an authentication dependency relationship, so as to ensure the efficient and normal execution of the authentication processing procedure. Of course, the authentication procedures of the authentication strategies in different authentication strategy groups may also be independent from each other.

In a specific example of the solution of the present application, the strategy scheduling unit is further configured for, after it is determined that there are at least two authentication strategy groups required by the authentication processing procedure of the to-be-authenticated information, calling the authentication strategy groups required by the to-be-authenticated information in sequence according to a preset dependency relationship, and performing authentication processing on the to-be-authenticated information in sequence. That is, before the authentication processing is performed, the authentication strategies required by the authentication processing procedure may be acquired firstly, e.g., all of the authentication strategies may be acquired, and then the authentication strategies are grouped based on the authentication dependency relationship therebetween to obtain the authentication strategy groups, wherein the authentication procedures of the authentication strategies in an authentication strategy group are independent from each other, while the authentication procedures of the authentication strategies in different authentication strategy groups have an or have no authentication dependency relationship, so as to ensure that the authentication processing procedures in the authentication strategy group can be performed in parallel, thereby efficiently improving the authentication processing efficiency.

Figure 5:
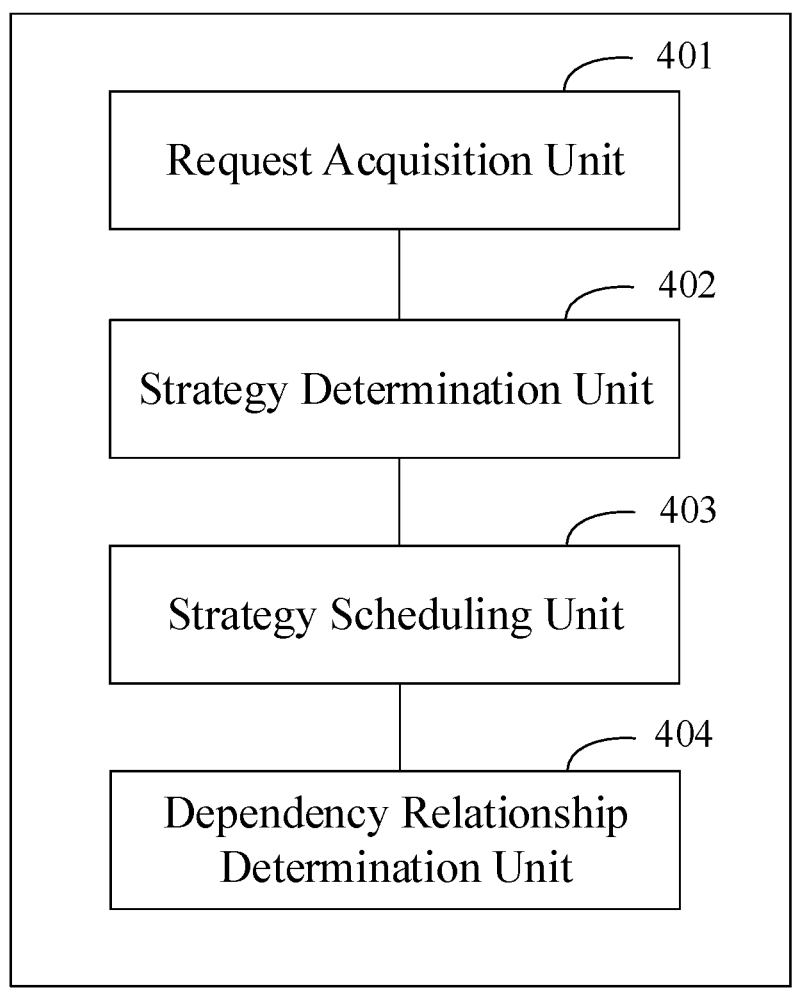
FIG. 5 is a second structural schematic diagram of a scheduling apparatus according to an embodiment of the present application.

In a specific example of the solution of the present application, as shown in FIG. 5, the scheduling apparatus may further include: a dependency relationship determination unit 404 configured for determining the authentication dependency relationship between the authentication strategy groups based on the to-be-authenticated information, to obtain the preset dependency relationship of the to-be-authenticated information.

Here, it is considered that in actual scenes, there may be a dependency relationship between the authentication strategies to ensure that the solution of the present application can be applied in a plurality of scenes, such as a scene where the authentication strategies are independent from each other, or a scene where the authentication strategies have a dependency relationship therebetween. At this time, the dependency relationship determination unit 404 may determine the preset dependency relationship between the authentication strategy groups in advance when the authentication strategies are grouped, so as to ensure the normal and efficient operation of the authentication procedure. Of course, when the to-be-authenticated information is determined and it is learned that the authentication procedure of the to-be-authenticated information requires at least two authentication strategy groups, the dependency relationship determination unit 404 may determine the authentication dependency relationship between the authentication strategy groups based on the to-be-authenticated information, so as to obtain the preset dependency relationship of the to-be-authenticated information; next, call the authentication strategy groups required by the to-be-authenticated information in sequence based on the preset dependency relationship, and perform authentication processing on the to-be-authenticated information in sequence among the authentication strategy groups.

Figure 6:
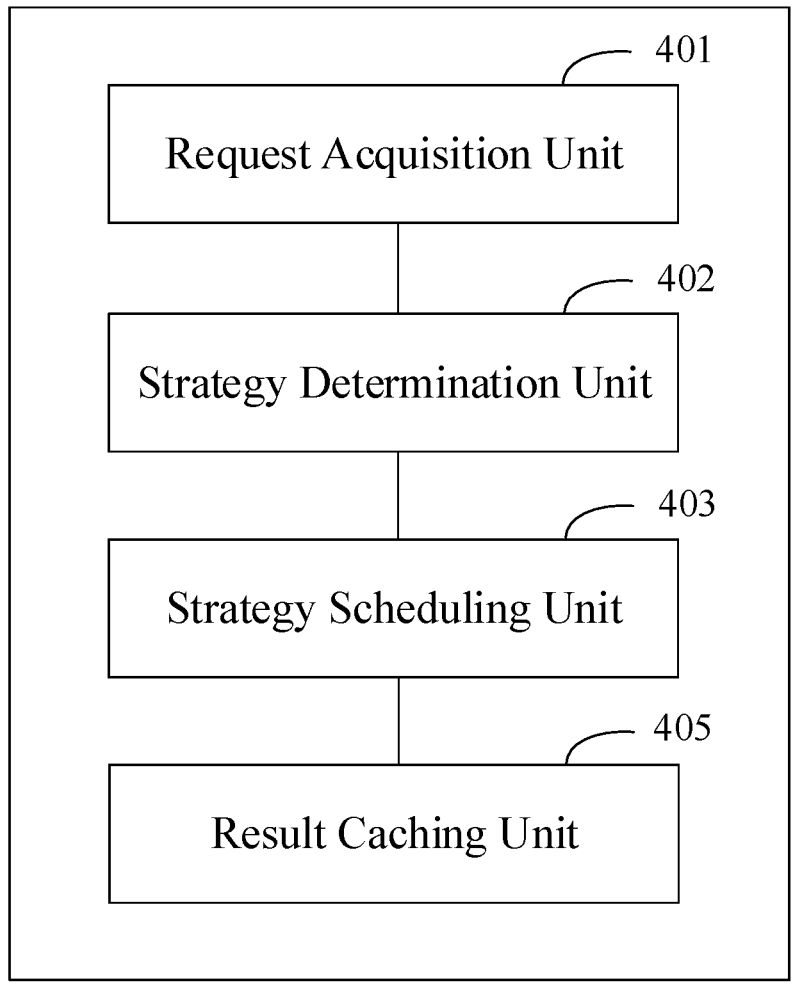
FIG. 6 is a third structural schematic diagram of a scheduling apparatus according to an embodiment of the present application.

In a specific example of the solution of the present application, as shown in FIG. 6, the scheduling apparatus may further include:

a result caching unit 405 configured for caching the authentication processing result corresponding to the authentication strategy group, so that another authentication strategy group required by the to-be-authenticated information is able to call the cached authentication processing result, and complete the authentication processing on the to-be-authenticated information. In this example, it needs to further improve the authentication processing efficiency and avoid the repeated execution of authentication strategies having an authentication dependency relationship. For example, the normal operations of an authentication strategy group B and an authentication strategy group C both depend on an authentication processing result of an authentication strategy group A. At this time, in order to avoid the repeated execution of the authentication strategy group A, the authentication processing result of the authentication strategy group A may be cached, and directly called when another authentication strategy group requires. For example, the authentication processing result of the authentication strategy group A may be cached, and then called during the execution of either of authentication strategy group B and authentication strategy group C, so as to ensure the normal operation of the authentication strategy group C. Meanwhile, the authentication processing efficiency is further improved and the application scenes are enriched, which lays a foundation for the subsequent engineering applications.

Here, in an example, the scheduling apparatus as described in the solution of the present application operates in an intelligent authentication system, and for example may be a separate server in the intelligent authentication system or a functional component thereof. Accordingly, the server in the intelligent authentication system may also be a cloud server, and at this time, the solution of the present application can be implemented by the cloud server.

In this way, in the solution of the present application, the authentication strategy groups can be determined based on the authentication dependency relationship between the authentication strategies, and after an authentication strategy group required by the authentication processing procedure of the to-be-authenticated information is determined, the authentication strategies in the group can perform authentication processing on the to-be-authenticated information in parallel, so the authentication processing efficiency certainly can be improved, and especially when there are many authentication strategies, the efficiency improvement advantage of the solution of the present application is more prominent.

It should be pointed out here that the description of the embodiments of the above apparatus is similar to the description of the embodiments of the method, has the same beneficial effects as that of the method, and will not be described in detail. For the technical details not disclosed in the embodiments of the apparatus of the present application, those skilled in the art should refer to the description of the embodiments of the method of the present application for understanding, which will not be repeated here in order to save space.

According to the embodiments of the present application, the present application also provides an electronic device and a readable storage medium.

Figure 7:
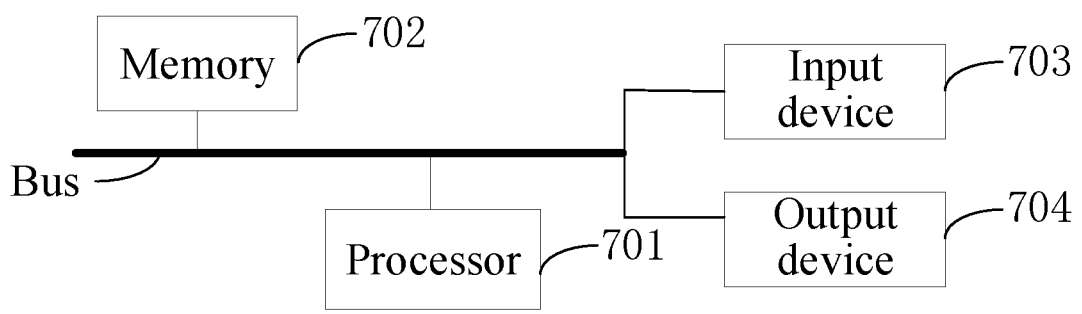
FIG. 7 is a block diagram of an electronic device for implementing a scheduling method according to an embodiment of the present application.

FIG. 7 is a block diagram of an electronic device for implementing a scheduling method according to an embodiment of the present application. The electronic device is intended to represent various forms of digital computers, such as laptop computers, desktop computers, workstations, personal digital assistants, servers, blade servers, mainframe computers, and other suitable computers. The electronic device may also represent various forms of mobile devices, such as a personal digital assistant, a cellular telephone, a smart phone, a wearable device, and other similar computing devices. The components shown herein, their connections and relationships, and their functions are by way of example only and are not intended to limit the implementations of the application described and/or claimed herein.

As shown in FIG. 7, the electronic device may include one or more processors 701, a memory 702, and interfaces for connecting components, including high-speed interfaces and low-speed interfaces. The respective components are interconnected by different buses and may be mounted on a common main-board or otherwise as desired. The processor may process instructions executed within the electronic device, including instructions stored in or on the memory to display graphical information of a graphical user interface (GUI) on an external input/output device, such as a display device coupled to the interface. In other implementations, a plurality of processors and/or buses may be used with a plurality of memories, if necessary. Also, a plurality of electronic devices may be connected, each providing some of the necessary operations (e.g., as an array of servers, a set of blade servers, or a multiprocessor system). An example of a processor 701 is shown in FIG. 7.

The memory 702 is a non-transitory computer-readable storage medium provided by the present application. The memory stores instructions executable by at least one processor to cause the at least one processor to execute the scheduling method provided by the present application. The non-transitory computer-readable storage medium of the present application stores computer instructions for enabling a computer to execute the scheduling method provided by the present application.

The memory 702, as a non-transitory computer-readable storage medium, may be configured to store non-transitory software programs, non-transitory computer executable programs and modules, such as program instructions/modules corresponding to the scheduling method in the embodiments of the present application (e.g., the request acquisition unit 401, the strategy determination unit 402, the strategy scheduling unit 403, the dependency relationship determination unit 404 and the result caching unit 405 as shown in FIG. 5 or 6). The processor 701 executes various functional applications and data processing of the server by running the non-transitory software programs, instructions and modules stored in the memory 702, that is, implements the scheduling method in the above method embodiment.

The memory 702 may include a program storage area and a data storage area, wherein the program storage area may store an operating system, and an application program required for at least one function; and the data storage area may store data created according to the use of the electronic device for implementing the scheduling method. In addition, the memory 702 may include a high speed random access memory, and may also include a non-transitory memory, such as at least one disk storage device, a flash memory device, or other non-transitory solid state storage devices. In some embodiments, the memory 702 may optionally include memories remotely located with respect to the processor 701, and these remote memories may be connected, via a network, to the electronic device for implementing the scheduling method. Examples of such networks may include, but are not limited to, the Internet, an intranet, a local area network, a mobile communication network and combinations thereof.

The electronic device for implementing the scheduling method may further include: an input device 703 and an output device 704. The processor 701, the memory 702, the input device 703, and the output device 704 may be connected by buses or in other ways, and the bus connection is taken as an example in FIG. 7.

The input device 703 may receive input digitals or character information, and generate a key signal input related to a user setting and a function control of an electronic device for implementing the scheduling method. For example, the input device may be a touch screen, a keypad, a mouse, a track pad, a touch pad, a pointer stick, one or more mouse buttons, a track ball, a joystick, and other input devices. The output device 704 may include a display apparatus, an auxiliary lighting device (e.g., a light emitting diode (LED)), a tactile feedback device (e.g., a vibrating motor), etc. The display apparatus may include, but is not limited to, a liquid crystal display (LCD), an LED display, and a plasma display. In some embodiments, the display apparatus may be a touch screen.

Various implementations of the systems and techniques described herein may be implemented in a digital electronic circuit system, an integrated circuit system, an application specific integrated circuit (ASIC), a computer hardware, a firmware, a software, and/or a combination thereof. These various implementations may include an implementation in one or more computer programs, which can be executed and/or interpreted on a programmable system including at least one programmable processor; the programmable processor may be a dedicated or general-purpose programmable processor and capable of receiving and transmitting data and instructions from and to a storage system, at least one input device, and at least one output device.

These computing programs (also referred to as programs, software, software applications, or codes) may include machine instructions of a programmable processor, and may be implemented using high-level procedural and/or object-oriented programming languages, and/or assembly/machine languages. As used herein, the terms "machine-readable medium" and "computer-readable medium" may refer to any computer program product, apparatus, and/or device (e.g., a magnetic disk, an optical disk, a memory, a programmable logic device (PLD)) for providing machine instructions and/or data to a programmable processor, including a machine-readable medium that receives machine instructions as machine-readable signals. The term "machine-readable signal" may refer to any signal used to provide machine instructions and/or data to a programmable processor.

In order to provide an interaction with a user, the system and technology described here may be implemented on a computer having: a display device (e. g., a cathode ray tube (CRT) or a liquid crystal display (LCD) monitor) for displaying information to the user; and a keyboard and a pointing device (e. g., a mouse or a trackball), through which the user can provide an input to the computer. Other kinds of devices can also provide an interaction with the user. For example, a feedback provided to the user may be any form of sensory feedback (e.g., visual feedback, auditory feedback, or tactile feedback); and an input from the user may be received in any form, including an acoustic input, a voice input or a tactile input.

The systems and techniques described herein may be implemented in a computing system (e.g., as a data server) that may include a background component, or a computing system (e.g., an application server) that may include a middleware component, or a computing system (e.g., a user computer having a graphical user interface or a web browser through which a user may interact with embodiments of the systems and techniques described herein) that may include a front-end component, or a computing system that may include any combination of such background components, middleware components, or front-end components. The components of the system may be connected to each other through a digital data communication in any form or medium (e.g., a communication network). Examples of the communication network may include a local area network (LAN), a wide area network (WAN), and the Internet.

The computer system may include a client and a server. The client and the server are typically remote from each other and typically interact via the communication network. The relationship of the client and the server is generated by computer programs running on respective computers and having a client-server relationship with each other. The server may be a cloud server, also called as a cloud computing server or a cloud host, which is a host product in a cloud computing service system, to solve the defects of difficult management and weak business expansibility in the services of the traditional physical host and the virtual private server (VPS).

In this way, in the solutions of the present application, authentication strategy groups can be determined based on the authentication dependency relationship between the authentication strategies, and after an authentication strategy group required by the authentication processing procedure of the to-be-authenticated information is determined, the authentication strategies in the group can perform authentication processing on the to-be-authenticated information in parallel, thus the authentication processing efficiency certainly can be improved, and especially when there are many authentication strategies, the efficiency improvement advantage of the solution of the present application is more prominent.

It should be understood that the steps can be reordered, added or deleted using the various flows illustrated above. For example, the steps described in the present application may be performed concurrently, sequentially or in a different order, so long as the desired results of the technical solutions disclosed in the present application can be achieved, and there is no limitation herein.

The above-described specific embodiments do not limit the scope of the present application. It will be apparent to those skilled in the art that various modifications, combinations, sub-combinations and substitutions are possible, depending on design requirements and other factors. Any modifications, equivalent substitutions, and improvements within the spirit and principles of this application are intended to be included within the scope of this application.

What is claimed is:

1. A scheduling method, comprising:
   acquiring an authentication request that indicates to-be-authenticated information;
   determining an authentication strategy group required by an authentication processing procedure of the to-be-authenticated information, wherein the authentication strategy group is determined based on an authentication dependency relationship between authentication strategies and comprises at least two authentication strategies; and
   calling the authentication strategies in the authentication strategy group in parallel, and performing authentication processing on the to-be-authenticated information in parallel, to obtain an authentication processing result corresponding to the authentication strategy group,
   wherein the method further comprises:
   after it is determined that there are at least two authentication strategy groups required by the authentication processing procedure of the to-be-authenticated information, calling the authentication strategy groups required by the to-be-authenticated information in sequence according to a preset dependency relationship, and performing the authentication processing on the to-be-authenticated information in sequence;
   wherein the at least two authentication strategy groups comprises a first authentication strategy group and a second authentication strategy group, the first authentication strategy group comprises a first authentication strategy, and the second authentication strategy group comprises a second authentication strategy; and
   wherein a normal operation of the second authentication strategy depends on an authentication result of the first authentication strategy.

2. The method according to claim 1, wherein authentication procedures of the authentication strategies in the authentication strategy group are independent from each other, so as to ensure that the authentication strategies in the authentication strategy group is able to be executed in parallel.

3. The method according to claim 1, wherein the authentication strategies in different authentication strategy groups have an authentication dependency relationship.

4. The method according to claim 1, further comprising:
determining the authentication dependency relationship between the at least two authentication strategy groups based on the to-be-authenticated information, to obtain the preset dependency relationship of the to-be-authenticated information.

5. The method according to claim 1, further comprising:
caching the authentication processing result corresponding to the authentication strategy group, so that another authentication strategy group required by the to-be-authenticated information is able to call the cached authentication processing result, and complete the authentication processing on the to-be-authenticated information.

6. The method according to claim 2, wherein the authentication strategies in different authentication strategy groups have an authentication dependency relationship.

7. A scheduling apparatus, comprising:
a processor and a memory for storing one or more computer programs executable by the processor,
wherein when executing at least one of the computer programs, the processor is configured to perform operations comprising:
acquiring an authentication request that indicates to-be-authenticated information;
determining an authentication strategy group required by an authentication processing procedure of the to-be-authenticated information, wherein the authentication strategy group is determined based on an authentication dependency relationship between authentication strategies and comprises at least two authentication strategies;
calling the authentication strategies in the authentication strategy group in parallel, and performing authentication processing on the to-be-authenticated information in parallel, to obtain an authentication processing result corresponding to the authentication strategy group;
after it is determined that there are at least two authentication strategy groups required by the authentication processing procedure of the to-be-authenticated information, calling the authentication strategy groups required by the to-be-authenticated information in sequence according to a preset dependency relationship, and performing the authentication processing on the to-be-authenticated information in sequence;
wherein the at least two authentication strategy groups comprises a first authentication strategy group and a second authentication strategy group, the first authentication strategy group comprises a first authentication strategy, and the second authentication strategy group comprises a second authentication strategy; and
wherein a normal operation of the second authentication strategy depends on an authentication result of the first authentication strategy.

8. The apparatus according to claim 7, wherein authentication procedures of the authentication strategies in the authentication strategy group are independent from each other, so as to ensure that the authentication strategies in the authentication strategy group is able to be executed in parallel.

9. The apparatus according to claim 7, wherein the authentication strategies in different authentication strategy groups have an authentication dependency relationship.

10. The apparatus according to claim 7, wherein, when executing at least one of the computer programs, the processor is configured to further perform operations comprising:
determining the authentication dependency relationship between the at least two authentication strategy groups based on the to-be-authenticated information, to obtain the preset dependency relationship of the to-be-authenticated information.

11. The apparatus according to claim 7, wherein, when executing at least one of the computer programs, the processor is configured to further perform operations comprising:
caching the authentication processing result corresponding to the authentication strategy group, so that another authentication strategy group required by the to-be-authenticated information is able to call the cached authentication processing result, and complete the authentication processing on the to-be-authenticated information.

12. The apparatus according to claim 8, wherein the authentication strategies in different authentication strategy groups have an authentication dependency relationship.

13. A non-transitory computer readable storage medium storing computer instructions, wherein the computer instructions cause a computer to perform steps comprising:
acquiring an authentication request that indicates to-be-authenticated information;
determining an authentication strategy group required by an authentication processing procedure of the to-be-authenticated information, wherein the authentication strategy group is determined based on an authentication dependency relationship between authentication strategies and comprises at least two authentication strategies; and
calling the authentication strategies in the authentication strategy group in parallel, and performing authentication processing on the to-be-authenticated information in parallel, to obtain an authentication processing result corresponding to the authentication strategy group,
wherein the method further comprises:
after it is determined that there are at least two authentication strategy groups required by the authentication processing procedure of the to-be-authenticated information, calling the authentication strategy groups required by the to-be-authenticated information in sequence according to a preset dependency relationship, and performing the authentication processing on the to-be-authenticated information in sequence;
wherein the at least two authentication strategy groups comprises a first authentication strategy group and a second authentication strategy group, the first authentication strategy group comprises a first authentication strategy, and the second authentication strategy group comprises a second authentication strategy; and
wherein a normal operation of the second authentication strategy depends on an authentication result of the first authentication strategy.

14. A The non-transitory computer readable storage medium of claim 13, wherein authentication procedures of the authentication strategies in the authentication strategy group are independent from each other, so as to ensure that the authentication strategies in the authentication strategy group is able to be executed in parallel.

15. The non-transitory computer readable storage medium of claim 13, wherein the authentication strategies in different authentication strategy groups have an authentication dependency relationship.

\* \* \* \* \*